(12) United States Patent
Prieto Conaway et al.

(10) Patent No.: US 11,688,596 B2
(45) Date of Patent: Jun. 27, 2023

(54) SYSTEMS AND METHODS LATTICE SPRAY SUBSTRATES FOR MASS SPECTROMETRY

(71) Applicant: Lawrence Livermore National Security, LLC, Livermore, CA (US)

(72) Inventors: Maria C. Prieto Conaway, Pleasanton, CA (US); Joshua R. Deotte, Livermore, CA (US); Nikola Dudukovic, Hayward, CA (US); Eric B. Duoss, Danville, CA (US); Bryan D. Moran, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 72 days.

(21) Appl. No.: 17/175,302

(22) Filed: Feb. 12, 2021

(65) Prior Publication Data

US 2022/0262613 A1    Aug. 18, 2022

(51) Int. Cl.
*H01J 49/04* (2006.01)
*B33Y 80/00* (2015.01)

(52) U.S. Cl.
CPC .......... *H01J 49/0409* (2013.01); *B33Y 80/00* (2014.12)

(58) Field of Classification Search
CPC ...... H01J 49/0409; H01J 49/16; H01J 49/165; G01N 33/6848
See application file for complete search history.

(56) References Cited

U.S. PATENT DOCUMENTS

| | | | |
|---|---|---|---|
| 8,816,275 B2 | 8/2014 | Ouyang et al. | |
| 8,859,956 B2 | 10/2014 | Ouyang et al. | |
| 8,859,958 B2 | 10/2014 | Ouyang et al. | |
| 8,859,959 B2 | 10/2014 | Ouyang et al. | |
| 2011/0111981 A1 | 5/2011 | Love et al. | |
| 2013/0143060 A1 | 6/2013 | Jacobsen et al. | |
| 2013/0264749 A1 | 10/2013 | Jones et al. | |
| 2015/0318158 A1* | 11/2015 | Pawliszyn | H01J 49/0031 250/288 |
| 2017/0321178 A1 | 11/2017 | Ling et al. | |
| 2018/0033600 A1 | 2/2018 | Manicke et al. | |
| 2018/0136137 A1* | 5/2018 | Jin | G01N 21/658 |

(Continued)

FOREIGN PATENT DOCUMENTS

| | | |
|---|---|---|
| WO | WO-2015100221 A2 | 7/2015 |
| WO | WO-2016130646 A1 | 8/2016 |

OTHER PUBLICATIONS

Dulay et al., Polymer-spray mass spectrometric detection and quantitation of hydrophilic compounds and some narcotics, Rapid Commun Mass Spectrom, 2017, 31, pp. 1651-1658.

(Continued)

*Primary Examiner* — Jason L Vaughan
*Assistant Examiner* — Amanda Kreiling
(74) *Attorney, Agent, or Firm* — Harness, Dickey & Pierce, P.L.C.

(57) ABSTRACT

The present disclosure relates to a lattice substrate adapted for use in direct ionization mass spectrometry. The substrate may have a plurality of tessellated unit cells forming an integral structure. Each tessellated unit cell may have a dimension of no more than about 1.5 mm and may include a plurality of pores arranged in an ordered pattern. The substrate may further include a form factor suitable for use with a direct ionization mass spectrometry system.

17 Claims, 3 Drawing Sheets

(56) References Cited

U.S. PATENT DOCUMENTS

2019/0039070 A1   2/2019   Matsunaga et al.

OTHER PUBLICATIONS

McKenna et al. Detection of chemical warfare agent simulants and hydrolysis products in biological samples by paper spray mass spectrometry, Analyst, 2017, 142, pp. 1442-1451.

Shen et al. High throughput paper spray mass spectrometry analysis, Clinica Chimica Acta, 2013, 420, pp. 28-33.

Yang et al. Paper spray ionization devices for direct, biomedical analysis using mass spectrometry, International Journal of Mass Spectrometry, 2012, 312, pp. 201-207.

International Search Report and Written Opinion regarding International Application No. PCT/US2022/015928, dated May 17, 2022.

* cited by examiner

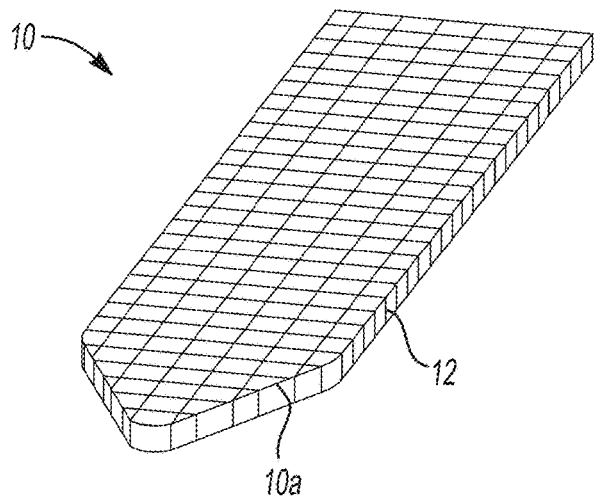
FIGURE 1
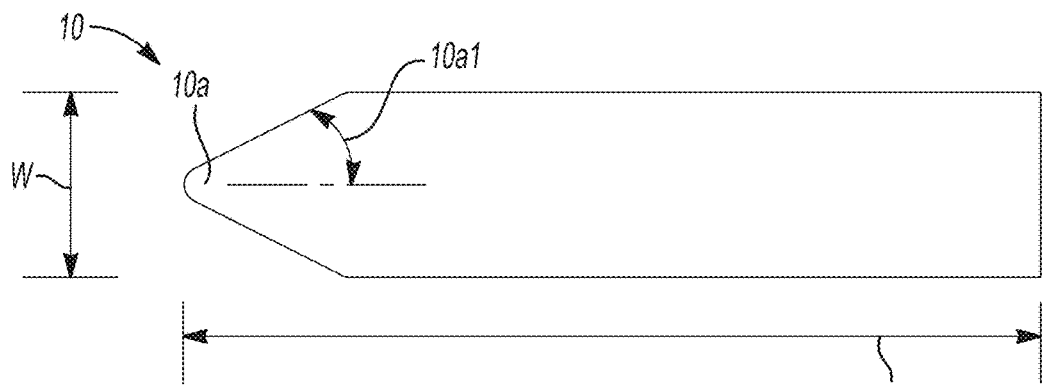
FIGURE 2
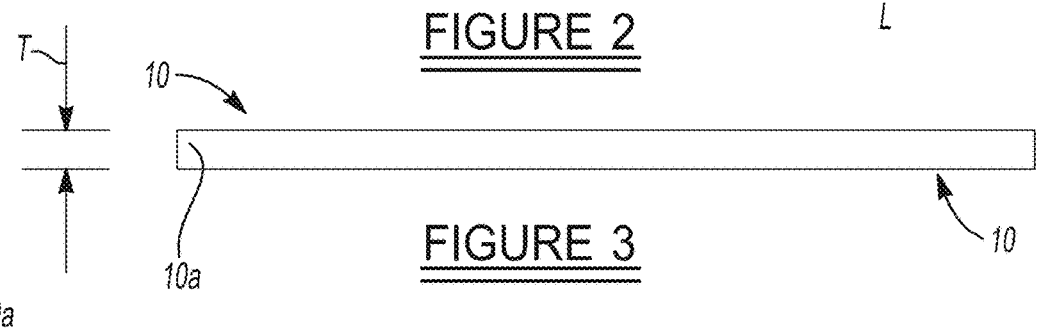
FIGURE 3
FIGURE 3a

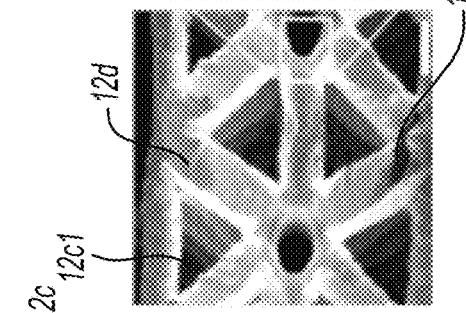
FIGURE 4
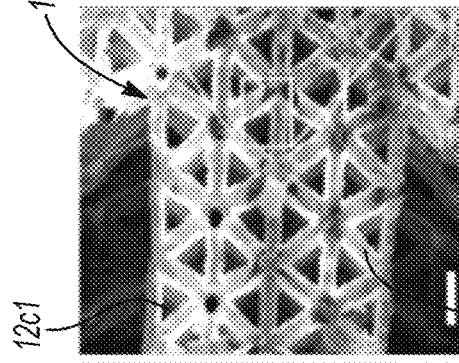
FIGURE 5
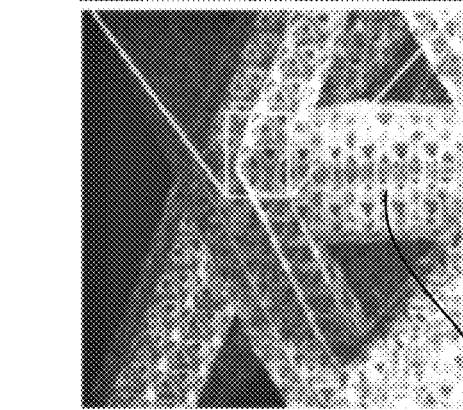
FIGURE 6
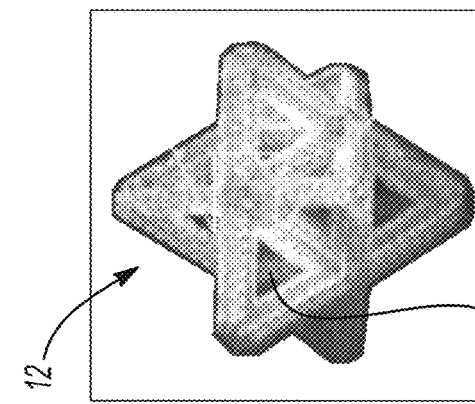
FIGURE 7
FIGURE 8
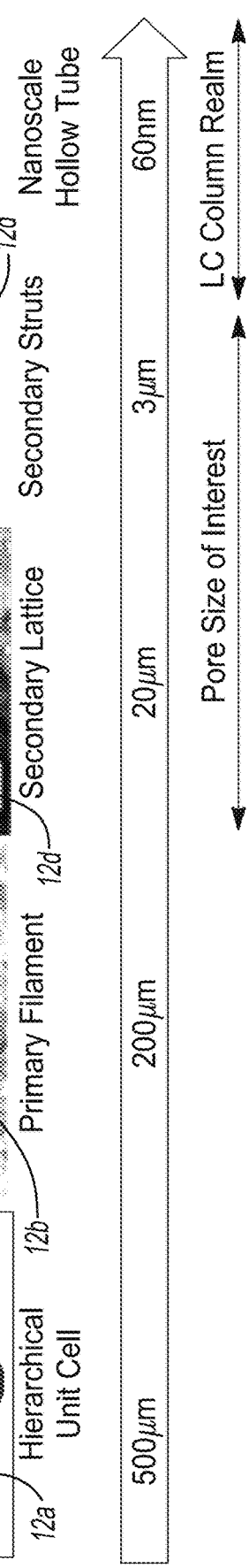

1) Blood Sample Collection

2) Spot Blood onto Substrate Hold Sample

3) Transport Dry Blood Spot

4) Elution of Sample and Detection by Electrospray MS

5) Analysis time of 1 min

SYSTEMS AND METHODS LATTICE SPRAY SUBSTRATES FOR MASS SPECTROMETRY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to lattice spray substrates, and particularly to lattice spray substrates that can be 3D printed with an engineered architecture, and which are well suited for the storage and transport of physiological and environmental agents and fluids, and which are especially well suited for use with existing direct ionization mass spectrometry systems.

BACKGROUND

The statements in this section merely provide background information related to the present disclosure and may not constitute prior art.

The traditional way of performing mass spectrometry is through Liquid Chromatography-Mass Spectrometry (LC-MS). This well-established technique using both Liquid Chromatography and Mass Spectrometry (MS), however, is time consuming to carry out, requires significant expertise to carry out, and requires the use of large solvent volumes. In particular, the LC operation can produce very good results (i.e., good separation of complex samples prior to performing MS).

The present day LC-MS process typically uses cellulose paper as a substrate when a direct ionization MS technique is to be used. However, paper suffers from many limitations, one of which is that it is not tunable; that is, it is typically comprised of a single material with the same surface energy. As such, it typically can only be used to analyze a few classes of molecules. So while the use of a paper substrate can shorten the time to perform LC-MS with a direct ionization MS process, the use of paper will negatively impact the results that can be obtained with the direction ionization MS process.

It would therefore be highly desirable to provide a substrate having an engineered architecture which is to receive a sample, and to perform direct ionization MS on a sample made up of a wide array of chemical and/or biological fluids, extracts and agents without the need to use a paper substrate for holding the sample. It would further be highly desirable if a substrate was available for direct ionization MS, where the substrate could be further tuned, for example with a selected coating(s), to determine which analytes of the sample are retained and which are recovered/extracted. It would further be highly desirable if a substrate could be manufactured with macro-scale properties, such that the substrate may be used, without modification, with existing direct ionization MS and related methods, as well as with micro-scale properties, for example selected porosities and characteristics such as being inert to one or more of organic solvents and/or water, and which may be even further tuned to the sample being collected.

SUMMARY

This section provides a general summary of the disclosure, and is not a comprehensive disclosure of its full scope or all of its features.

In one aspect the present disclosure relates to a lattice substrate adapted for use in direct ionization mass spectrometry. The substrate may comprise a plurality of tessellated unit cells forming an integral structure. Each tessellated unit cell may have a dimension of no more than about 1500 µm, and may include a plurality of pores arranged in an ordered pattern. Each tessellated cell may further having a form factor suitable for use with a direct ionization mass spectrometry system.

In another aspect the present disclosure relates to a lattice substrate adapted for use in direct ionization mass spectrometry. The substrate may comprise a plurality of tessellated unit cells forming an integral, elongated flat structure with first and second ends, and one of the first and second ends forming a pointed end. Each tessellated unit cell may have a dimension of no more than about 1.5 mm, and may form a plurality of internal voids acting as pores, with the pores arranged in an ordered pattern along a length of the substrate. The substrate may include a form factor with a length and width each being greater than a thickness thereof.

In still another aspect the present disclosure relates to a method of constructing a lattice substrate adapted for use in direct ionization mass spectrometry. The method may include forming a substrate having a plurality of tessellated unit cells forming an integral structure. The method may further include forming the tessellated unit cells such that each has a dimension of no more than about 1.5 mm, and such that each includes a plurality of pores arranged in an ordered pattern. The method may further include forming the substrate with a form factor suitable for use with a direct ionization mass spectrometry system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1 is a perspective view of one embodiment of a substrate in accordance with the present disclosure that is well suited for use with existing, present day direct ionization mass spectrometry systems;

FIG. 2 is a high level plan view of the substrate of FIG. 1 to help illustrate the relative length and width of the substrate of this embodiment;

FIG. 3 is a high level side cross-sectional view of the substrate shown in FIG. 1 to help illustrate the relative thickness and length of the substrate of this embodiment;

FIG. 3a is a simplified side cross-sectional view of another embodiment of the substrate of the present disclosure which includes a plurality of distinct regions having differing porosities, and where in this example the pore size decreases moving toward a tip portion of the substrate;

FIGS. 4-8 showing successively enlarged portions of a hierarchical unit cell, in FIG. 8 shown as an Octet-truss, illustrating examples of dimensions of each portion;

DETAILED DESCRIPTION

Figure 9:
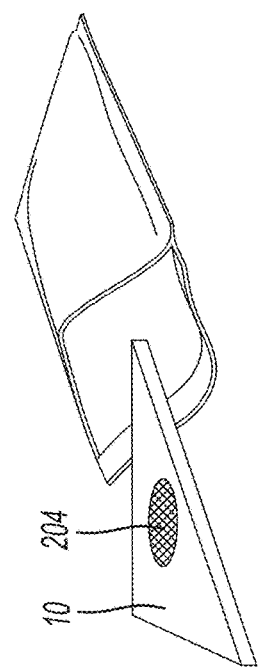
FIGS. 9-12 show steps that may be performed using the substrate of FIG. 1 to perform direct ionization mass spectrometry on a dried blood sample.

Example embodiments will now be described more fully with reference to the accompanying drawings.

The present disclosure relates to the design and manufacture of devices for the storage, transport and mass spectrometric analysis of physiological and environmental samples. More particularly, the present disclosure relates to various embodiments and methods of manufacture of a 3D printed substrate with optimized engineered architecture for the storage and sample processing of chemical, biological, or material specimens that are gas, liquid or solid, and which can be used with present day, widely available, direct ionization mass spectrometry (MS) devices for the analysis of the sample material specimen(s). The invention solves the limitations of using paper as the substrate for mass spectrometry. The invention expands the range of molecules that can be analyzed by direct ionization mass spectrometry from complex matrices, in one example blood or urine, to both hydrophilic and hydrophobic small molecules and large molecules (e.g., proteins). The invention also lowers the variability in the extraction/ionization process and the need to include an internal standard in the sample. A particularly important benefit of the present invention is that it is able to replace a complex traditional technique (LC-MS) with a substrate construction that enables a simple, all-in-one sample processing and ionization process, and which eliminates the time consuming solvent-intensive liquid chromatography step.

Referring to FIG. 1, a substrate 10 in accordance with one embodiment of the present disclosure is illustrated. In this example the substrate forms a 3D printed substrate made from 3D printing process. In some specific methods of manufacture, the substrate 10 is formed using a projection microstereolithography 3D printing process or a large area projection microstereolithography 3D printing process, although the present disclosure is not limited to any specific type or form of 3D printing process. In some embodiments the substrate may be formed from materials including, and without limitation, a polymer, various resins, metals or even ceramics, or a combination of two or more of the foregoing materials. The substrate 10 may also be formed with predetermined hydrophilic or hydrophobic properties, or even a combination of both properties. In each case, the substrate 10, when constructed using one or more of the above materials, provides significant benefits over the use of a paper substrate, as will become apparent in the following discussion.

The substrate 10 shown in FIG. 1 forms a relatively thin, elongated element with a relatively sharp pointed end 10a, and is of dimensions making it suitable for use with present day commercially available direction ionization mass spectrometry (MS) systems. One such present day system is the VeriSpray™ PaperSpray Ion Source, available from Thermo Scientific, which requires a substrate with dimensions of 29.5 mm length×6.00 mm width×0.5 mm thickness. Another such system is the Prosolia Velox™ System with PaperSpray™ technology, available from Prosolia, which requires a substrate with slightly larger dimensions that those given above. Accordingly, in one embodiment, as shown in FIGS. 2 and 3, the substrate 10 may have a length "L" of no more than about 32 mm, and in one specific embodiment a length of 29.5 mm. In one embodiment the substrate 10 may also have a width "W" of no more than about 6 mm, and in one specific embodiment a width of 6 mm. In one embodiment the substrate 10 may have a thickness "T" of no more than about 1.0 mm, and in one specific embodiment may have a thickness of 0.5 mm. In one specific embodiment the substrate may have a length of 29.5 mm, a width of 6 mm and a thickness of 0.5 mm, making it ready for use with no modification with the Thermo Scientific VeriSpray™ PaperSpray Ion Source. In another embodiment these dimensions are slightly larger, making the substrate 10 ready for use with the Prosolia Velox 360™ System.

The angle 10a1 of the pointed end 10a shown in FIG. 2 may vary significantly, and in some embodiments is it between about 15 degrees-75 degrees, and in some applications may be about 30 degrees.

FIG. 3a shows a substrate 100 in accordance with another embodiment of the present disclosure in which the substrate 100 includes a plurality of distinct regions 102, 104 and 106 having differing porosities. In this example the region 106 has the lowest porosity (i.e., pores of the smallest dimension), the region 104 has the next highest porosity and the region 102 has the highest porosity (i.e., pores of the largest dimension). Accordingly, in this example the porosity of the substrate 100 is engineered to help channel a sample fluid toward a tip portion 100a of the substrate 100. The substrates 10 or 100 could each be designed with a greater or lesser number of different porosities and/or different cell shapes, and/or cells of different dimensions, and/or with different coatings, and/or with different materials, and/or with different beam diameters, and/or with different strut profiles as needed to optimize the substrate 10 or 100 for use with a specific sample. It is expected that further experimentation and use of the substrate 10 or 100 will further help to determine how the material and porosity behave together as they vary. It will be appreciated that presently available, conventional paper spray devices will vary depending on the material used and the size used, in addition to variations in other factors/aspects as well.

Referring to FIGS. 4-8, an internal portion of the substrate 10 is shown in greater detail. In one embodiment the substrate 10 is formed with a suitable material (e.g., polymer, metal, ceramic, etc.) to have a plurality of interconnected (i.e., tessellated) unit cells. In some embodiments, as shown in FIG. 4, each unit cell, or a subplurality of the unit cells making up the overall substrate 10, may be formed in the shape of an Octet-truss unit cell 12. Each Octet-truss unit cell 12 may vary significantly in dimensions to meet the needs of a specific application or specific sample (e.g., specific fluid or other material), but in one embodiment each Octet-truss unit cell is about 500 microns in height, length and depth, though all dimensions do not need to be the same. The tessellated Octet-truss unit cells 12 may each form a plurality of voids 12a, which in this example are shaped with a pyramid shape, which is especially useful in direct ionization mass spectrometry applications for channeling a fluid sample received on the substrate 10. The Octet-truss unit cells 12 may be formed and interconnected using a plurality of primary filaments 12b, as shown in FIG. 5. Each primary filament 12b may range significantly in diameter but in one preferred form is between about 500 microns and 10 microns in diameter or cross-sectional length and width. In some embodiments the primary filaments 12b may be round, and in some embodiments they take other cross-sectional shapes. Each primary filament 12b may be constructed as a secondary lattice 12c, as shown in FIG. 6. Each secondary lattice unit cell 12c may vary in dimensions, but in some embodiments is between about 500 microns-10 microns in length. Each secondary lattice 12c may be formed by a plurality of interconnecting secondary struts 12d, as shown in FIG. 7. A major subplurality of the secondary struts 12d are formed non-parallel to one another, which results in the formation of a plurality of pyramid shaped voids 12c1 within the secondary lattice structure 12c. Each secondary strut 12d may range significantly in cross-sectional diameter, and in some embodiments may be between 100 microns-300 nanometers. FIG. 8 illustrates that each secondary strut 12d may be hollow. Alternatively, each secondary strut 12d may be solid. Optionally, some secondary struts 12d may be manufactured as hollow and others formed as solid struts. The dimensions of each of the Octet-truss unit cells 12, the primary filaments 12b, the secondary lattice structures 12c and the secondary struts 12d may vary in dimensions throughout a dimension of the substrate 10, and in one example may vary throughout a length of the substrate 10.

The interconnected Octet-trusses 12 form the substrate 10 as a microlattice structure with engineered (i.e., "ordered") unit cells. In some embodiments other shapes of trusses are used, for example simple cubic, body-centered cubic, face-centered cubic, and isotruss, among others.

With the Octet-truss unit cells 12 forming the substrate 10 as shown in FIGS. 4-8, the Octet-truss unit cells create the voids 12a, which may also be thought of as pores, having a desired dimension. However, substrates with larger or smaller pores may also be constructed, and the present disclosure is not limited to forming the substrate 10 with voids or pores of any specific shape or dimension. In some embodiments the octet-truss unit cells 12 form voids or pores in a preferred range of 10 microns-500 microns. Voids or pores in these size ranges are similar to paper substrates presently used with direct ionization mass spectrometry systems, and therefore the substrate 10 is well suited for use with such present day systems.

In direct ionization mass spectrometry applications, octet-truss unit cells are particularly advantageous for use in the substrate 10 because of the pyramid shape of the voids 12a, as visible in FIGS. 4-8. The unit cell design creates voids that provide pathways for fluid flow while maintaining structural rigidity and shape.

A particular advantage of the substrate 10 or 100 is that by being constructed using 3D printing techniques, the substrate 10 or 100 is also able to be constructed with hierarchical microstructures, if desired, as noted above in the description of the substrate 100. The use of a plurality of hierarchical microstructures can lend different properties to the final material. The differing properties may be exploited to influence the adsorption and desorption of different classes of molecules from complex matrices, for example blood or urine, when such fluids are spotted onto the substrate 100. An engineered substrate such as the substrate 10 or 100 offers a well-controlled molecular testbed that allows for systematic parametric optimization studies, contrary to cellulosic paper. Projection microstereolithography is a particularly desirable manufacturing technique for forming the substrate 10 or 100 due to its high degree of three-dimensional complexity, its ability to enable engineering control over feature sizes across multiple length scales, and a wide materials palette that may be used in constructing the substrate. In aggregate, these factors enable 3D printing of the lattice substrate 10 or 100 with greater performance and materials compatibility over their paper-based counterparts.

Figure 10:
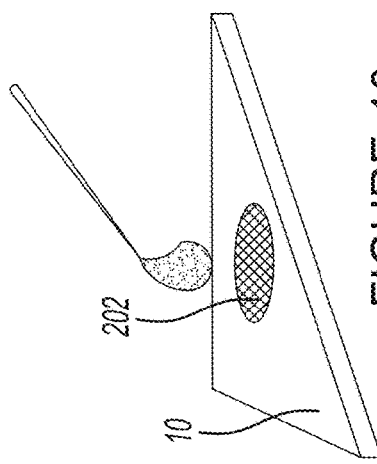
Figure 11:
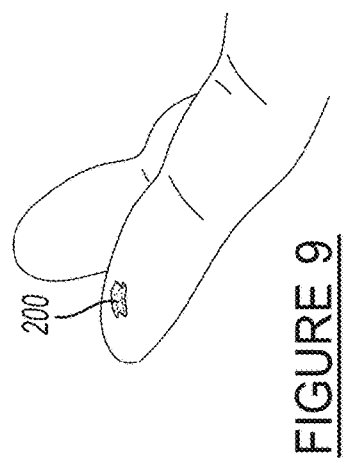
Figure 12:
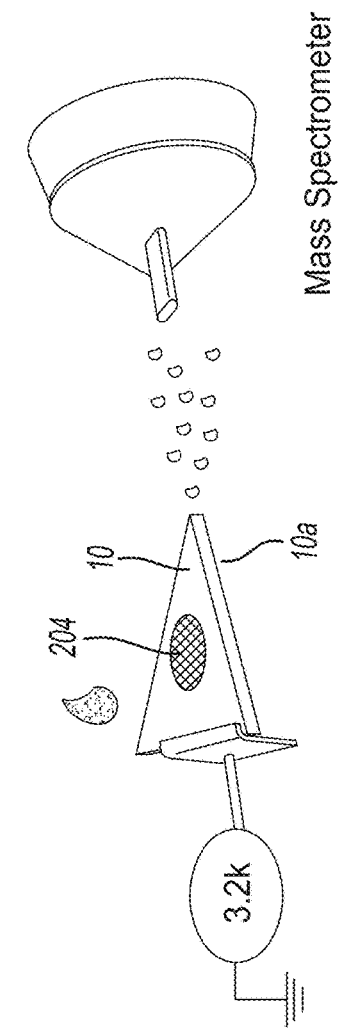
Figure 13:
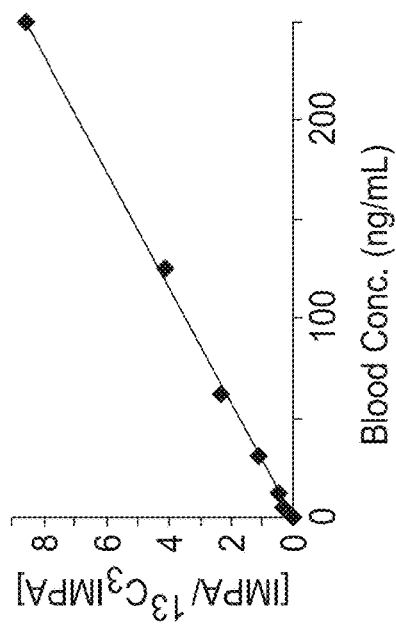
FIG. 13 shows an example illustrating the quantitation of a chemical warfare agent (CWA) simulation hydrolysis product isopropyl methylphosphonic acid as a function of blood concentration (ng/mL).

FIGS. 9-12 illustrate one just application of the substrate 10 being used in a direct ionization process to analyze a blood sample. FIG. 9 shows a blood sample 200 being produced from a patient. FIG. 10 illustrates the substrate 10 with a blood spot 202 created thereon by depositing the blood sample onto an upper surface of the substrate 10. FIG. 11 shows the substrate 10 now with the bloodspot 200 in a dried condition, forming a dried bloodspot 204. The substrate 10 may now be stored in a suitable container or envelope for transport to a laboratory or for other temporary storage. FIG. 12 shows the substrate 10 being wet with a suitable solution (e.g., organic/water 0.01% acetic acid (90:10) in sample is organic (or different if water soluble). The direction ionization mass spectrometry operation is then performed by applying a suitable voltage (e.g., 3800 V-5000 V, for positive ionization) to eject analyte in the dried blood sample 204 from the substrate 10 into the mass spectrometer positioned closely adjacent the tip 10a of the substrate 10. FIG. 13 shows a graph illustrating compound ionization vs. blood concentration (ng/mL).

The various embodiments of the present disclosure described herein provide a number of benefits of present day paper substrates. Some of these benefits are as follows:

1) The substrate 10 or 100 may be used with sample clean-up and processing of wet physiological samples that are deposited on the substrate (i.e., sample preparation prior to mass spectrometry analysis).

2) The substrate 10 or 100 may be used as sample clean-up and processing of soil or soil extract samples that are deposited on the substrate (i.e., sample preparation prior to mass spectrometry analysis).

3) The substrate 10 or 100 may be used in connection with sample clean-up and processing of water samples that are deposited on the substrate (i.e., sample preparation prior to mass spectrometry analysis).

4) The substrate 10 or 100 may be used as a means for storage and transport of dried physiological samples (e.g., and without limitation, blood, urine, cerebrospinal fluid, tears, sweat, ocular fluids or any fluid sampled from human bodies).

5) The substrate 10 or 100 may be used as a means for storage and transport of environmental samples (e.g., fresh water, salt water, soil extracts, soils, etc.).

6) The substrate 10 or 100 may be used as an ionization device (i.e., as a device to introduce ions into a mass spectrometer).

7) The substrate 10 or 100 used as a means to help facilitate the analysis of samples by mass spectrometry in the field of clinical research.

8) The substrate 10 or 100 may be used to analyze samples by mass spectrometry for a wide range of different disciplines, for example and without limitation, in connection with Laboratory Developed Tests (LDT) classification (e.g., class under in vitro diagnostics), or in therapeutic drug monitoring or research (e.g., contract laboratories, hospitals, doctor's offices), or in forensic and clinical toxicology monitoring or research, or in beverage and food industry, or in the monitoring of drug and food adulteration (food and drug integrity and safety), or in connection with the analysis of pesticides and/or veterinary drugs (i.e., environmental field application), or for performing analysis in the field of proteomics research or targeted proteomics, or in surveillance/monitoring of chemical and biological agents in human and environmental samples, or in connection with the analysis of substance/samples obtained by law enforcement, or in connection with the MS analysis of dried fluid samples being used in connection with population studies (e.g., large number of samples that have been collected in remote areas and transported to clinical or research laboratories).

In the various embodiments described herein, the substrate 10 or 100 each form a complex 3D structure which is stiff, strong, yet lightweight and easily handled, stored and/or packaged. The various embodiments of the substrate 10 or 100 enable the liquid chromatography step to be eliminated, and direct ionization MS performed on a sample material. This dramatically reduces the time required to perform analysis of the sample material, and makes the substrate ideally suited in many different real world applications where rapid analysis (e.g., less than 1 hour) of the sample material is. As such, the various embodiments of the substrate 10 enable direct ionization MS analysis to be performed in widely differing applications (e.g., medical, narcotics interdiction, national security, etc.) where rapid analysis of a sample material is imperative.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A lattice substrate adapted for use in direct ionization mass spectrometry, the substrate comprising:
    a plurality of tessellated unit cells forming an integral structure, the tessellated unit cells each being formed by a plurality of intersecting filaments;
    each said tessellated unit cell having a dimension of no more than about 1500 μm, and including a first plurality of voids formed by the intersecting filaments, the first plurality of voids being arranged in a first ordered pattern;
    each said filament including a secondary lattice structure having a second plurality of voids formed by a plurality of struts that extend non-parallel to one another in three dimensions, the second plurality of voids also forming a second ordered three dimensional pattern; and
    a form factor suitable for use with a direct ionization mass spectrometry system.

2. The substrate of claim 1, wherein each said tessellated unit cell comprises an Octet-truss shape.

3. The substrate of claim 1, wherein struts of the secondary lattice structure comprise a plurality of intersecting struts which form the second plurality of voids.

4. The substrate of claim 3, wherein each one of said plurality of intersecting struts has a diameter in a range of between 100 microns and 300 nanometers.

5. The substrate of claim 1, wherein each one of said intersecting filaments has a diameter in a range between 500 microns and 10 microns.

6. The substrate of claim 1, wherein the tessellated unit cells differ in size along a dimension of the substrate, to provide an engineered porosity to the substrate over a dimension thereof.

7. The substrate of claim 6, wherein at least some of the tessellated unit cells comprise an Octet-truss shape.

8. The substrate of claim 1, wherein the tessellated unit cells differ in size along a length dimension of the substrate.

9. The substrate of claim 1, wherein the substrate includes:
   a length of no more than about 29.5 mm;
   a width of no more than about 6 mm;
   a thickness of no more than about 500 microns; and
   a pointed end at one outermost end thereof.

10. The substrate of claim 9, wherein the tessellated unit cells each comprise Octet-truss shaped unit cells having a dimension of about 500 microns in each of length, width and height, and each one of the first plurality of voids forming a pyramid shaped void.

11. A lattice substrate adapted for use in direct ionization mass spectrometry, the substrate comprising:
   a plurality of tessellated unit cells forming an integral, elongated flat structure with first and second ends, and one of the first and second ends forming a pointed end;
   each said tessellated unit cell having a dimension of no more than about 1.5 mm, and each said tessellated unit cell forming a plurality of internal voids acting as pores, with the pores arranged in an ordered pattern along a length of the substrate;
   the substrate including a form factor with a length and width each being greater than a thickness thereof; and
   the tessellated unit cells including Octet-truss shaped unit cells.

12. The lattice substrate of claim 11, wherein the form factor includes:
   a length of no more than about 25 mm; and
   a thickness of no more than about 500 microns.

13. The lattice substrate of claim 12, wherein the form factor includes a width of no more than about 20 mm.

14. The substrate of claim 11, wherein the first plurality of voids within each said tessellated unit cell creates an engineered, varying porosity over a length of the substrate.

15. A method of constructing a lattice substrate adapted for use in direct ionization mass spectrometry, the method including:
   forming a substrate having a plurality of tessellated unit cells, each one of the tessellated unit cells having a plurality of intersecting filaments and the plurality of tessellated unit cells forming an integral structure;
   forming the tessellated unit cells such that each has a dimension of no more than about 1.5 mm, and such that each one of said tessellated unit cells includes a first plurality of voids arranged in an ordered pattern;
   further forming each said intersecting filament with a secondary lattice structure, the secondary lattice structure having a plurality of struts that extend and intersect in three non-parallel dimensions to form a second plurality of voids therein; and
   further forming the substrate with a form factor suitable for use with a direct ionization mass spectrometry system.

16. The method of claim 15, wherein forming the substrate comprises creating the substrate with a three-dimensional printing process using a least one of a polymer, a ceramic or a metal.

17. A lattice substrate adapted for use in direct ionization mass spectrometry, the substrate comprising:
   a plurality of tessellated unit cells having a plurality of intersecting filaments forming an integral structure;
   each said tessellated unit cell including a first plurality of voids, formed by the intersecting filaments, where the first plurality of voids extend in three dimensions in a first ordered pattern;
   each said filament comprises of a secondary lattice structure, with the secondary lattice structing including a plurality of intersecting struts extending non-parallel to one another in three dimensions, and forming a second plurality of voids extending in a three dimensional, second ordered pattern therewithin; and
   a form factor suitable for use with a direct ionization mass spectrometry system.

* * * * *